United States Patent [19]
Schuelke et al.

[11] Patent Number: 5,599,067
[45] Date of Patent: Feb. 4, 1997

[54] ADJUSTABLE ARM REST ASSEMBLY

[75] Inventors: David Schuelke, Grand Rapids; Andrew Kurrasch, Saugatuck; Douglas Brandt, Zeeland, all of Mich.

[73] Assignee: Herman Miller, Inc., Zeeland, Mich.

[21] Appl. No.: 484,780

[22] Filed: Jun. 7, 1995

[51] Int. Cl.$^6$ ..................................................... B60N 2/46
[52] U.S. Cl. ........................... 297/411.35; 297/411.36; 297/411.37; 403/97; 403/93
[58] Field of Search .......................... 297/411.35, 411.36, 297/411.37; 403/97, 95, 93, 84

[56] References Cited

U.S. PATENT DOCUMENTS

| | | |
|---|---|---|
| 1,260,032 | 3/1918 | Perpick . |
| 1,407,174 | 2/1922 | Simpson . |
| 2,569,834 | 10/1949 | Smith . |
| 3,300,250 | 1/1967 | Dollgener et al. . |
| 4,176,878 | 12/1979 | Koutsky . |
| 4,244,623 | 2/1981 | Hall et al. . |
| 4,277,102 | 7/1981 | Aaras et al. . |
| 4,311,338 | 1/1982 | Moorhouse . |
| 4,872,727 | 10/1989 | Rye . |
| 4,884,846 | 12/1989 | Tobler . |
| 4,951,995 | 8/1990 | Teppo et al. . |
| 5,143,422 | 9/1992 | Althofer et al. . |
| 5,199,765 | 4/1993 | Garmendia et al. . |

FOREIGN PATENT DOCUMENTS

| | | |
|---|---|---|
| 82304871 | 6/1983 | European Pat. Off. . |
| WO93/25121 | 12/1993 | WIPO . |

Primary Examiner—Peter M. Cuomo
Assistant Examiner—Stephen Vu
Attorney, Agent, or Firm—Brinks Hofer Gilson & Lione

[57] ABSTRACT

An adjustable arm rest assembly for use on a chair including a support member, an arm rest member, a locking element and an adjustment member. The support member is attached to the chair and extends substantially upward therefrom. The arm rest member extends substantially coaxially with the support member. The locking element is attached to one of the support member and the arm rest member. A projecting portion extends from an end portion of the locking element and includes a first mating element. The adjustment member is attached to the other of the support member and the arm rest member. The adjustment member and the locking element are movable with respect to one another. A plurality of vertically spaced flanges form a plurality of recesses within the adjustment member. Each recess is sized to receive the projecting portion of the locking element and has a second mating element corresponding to the first mating element. The arm rest member is angularly movable when the first and second mating elements are disengaged. The arm rest member is also angularly and vertically movable when the first and second mating elements are disengaged and the projecting portion of the locking element is disengaged from the recess of the adjustment member.

19 Claims, 5 Drawing Sheets

ADJUSTABLE ARM REST ASSEMBLY

BACKGROUND OF THE INVENTION

The present invention relates to the field of arm rests for use on chairs. More particularly, the invention relates to the field of arm rests which are adjustable to various positions and heights to provide a more comfortable chair for a user.

Chairs, particularly office chairs, are often designed with the arm rests secured in a fixed position based on the intended use of the chair and the average size of the expected users. However, in an office environment, people of different sizes may spend many hours in the same size chair. Therefore, it is desirable to have arm rests that are adjustable to match the specific anatomy of a given user. A chair, in particular the arm rests, should be comfortable for people of widely varying sizes and shapes. Similarly, an arm rest should be adjustable depending on the varied activities of the user of the chair. For example, a user may desire to have an arm rest at a first height when working with a pen and paper on a desk, but desire a second height when working with a computer. In addition, arm rests should also be angularly adjustable in order to accommodate the varied activities associated with use of the chair. A user may desire the arm rests in a first angular position when typing or working with a pen and paper. The user, however, may desire a second angular position when working with a mouse for a computer.

Some adjustable arm rests have been disclosed in the prior art. For example, in U.S. Pat. No. 4,951,995 issued to Teppo et al., a complex arm height adjustment mechanism for a chair is disclosed. A vertical motion translation mechanism interconnects two laterally spaced arm rests. A cable assembly together with a rotatable gear translate movement from a first arm into a corresponding movement in the second arm thereby providing for the synchronized movement of the arm rest assemblies. U.S. Pat. No. 4,884,846 issued to Tobler, discloses arm rests with limited height adjustment capabilities. The arm rest is adjusted through the rotation of a carrier element on the arm rest support. The support element is a two part bolt construction with right-hand and left-hand threads coupled together by the carrier element.

While adjustable arm rests have been previously disclosed, there still exists a need for adjustable arm rests that provide reliable operation at a reduced manufacturing cost.

SUMMARY OF THE INVENTION

Briefly stated, the present invention is directed to an adjustable arm rest assembly for use on a chair including a support member, an arm rest member, a locking element and an adjustment member. According to a first aspect of the invention, the support member is attached to the chair and extends substantially upward therefrom. The arm rest member extends substantially coaxially with the support member. The locking element is attached to one of the support member and the arm rest member. A projecting surface extends from an end portion of the locking element and includes a first mating element. The adjustment member is attached to the other of the support member and the arm rest member. The adjustment member and the locking element are movable with respect to one another. A plurality of vertically spaced flanges form a plurality of recesses within the adjustment member. Each recess is sized to receive the projecting portion of the locking element and has a second mating element corresponding to the first mating element. The arm rest member is angularly movable when the first and second mating elements are disengaged. The arm rest member is also angularly and vertically movable when the first and second mating elements are disengaged and the projecting portion of the locking element is disengaged from the recess of the adjustment member.

According to another aspect of the invention, the locking element is attached to the support member and the adjustment member is attached to the arm rest member.

According to a further aspect of the invention, the first mating element comprises a plurality of vertically extending teeth and the second mating element comprises a pin-shaped surface.

The adjustable arm rest assembly of the present invention has three basic modes of operation: 1) a locked position, 2) an angularly movable position, and 3) an angularly and vertically movable position. In the locked position, the projecting surface of the locking element is engaged within a recess of the adjustment member and the first and second mating elements are engaged. In the angularly movable position, the projecting surface of the locking element is engaged within the recess of adjustment member. However, the first and second mating elements are disengaged so as to allow for angular movement of the arm rest member. In the angularly and vertically movable position, the projecting surface of the locking element is disengaged from the recess of the adjustment member and the first and second mating elements are also disengaged. In this position, the arm rest member is angularly and vertically movable to a position selected by a user.

The present invention will be best understood with reference to the detailed description below read in conjunction with the accompanying drawings.

DETAILED DESCRIPTION OF THE PREFERRED EMBODIMENTS

Figure 1:
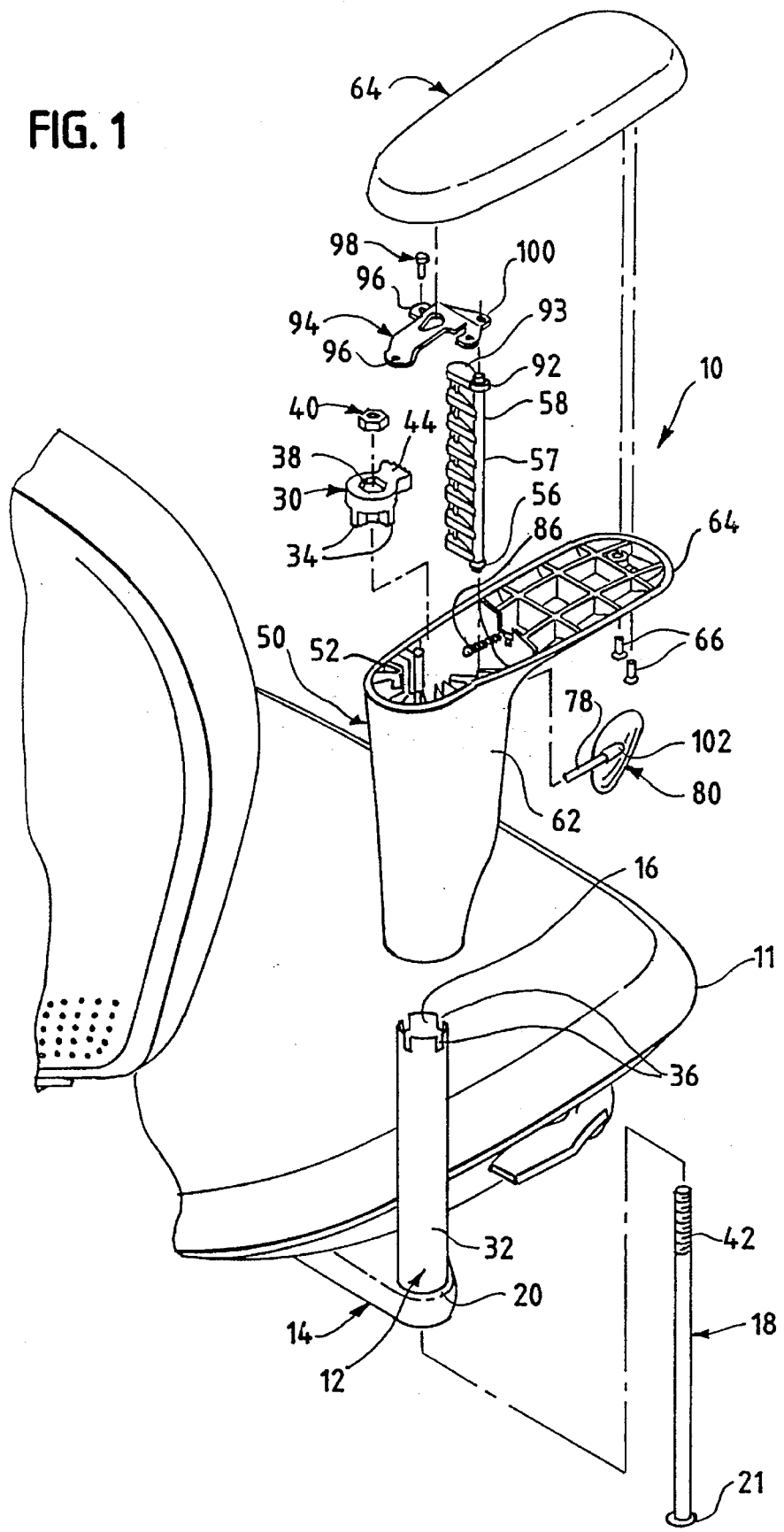
FIG. 1 is an exploded view of a preferred embodiment of the adjustable arm rest assembly of the present invention.
Figure 2:
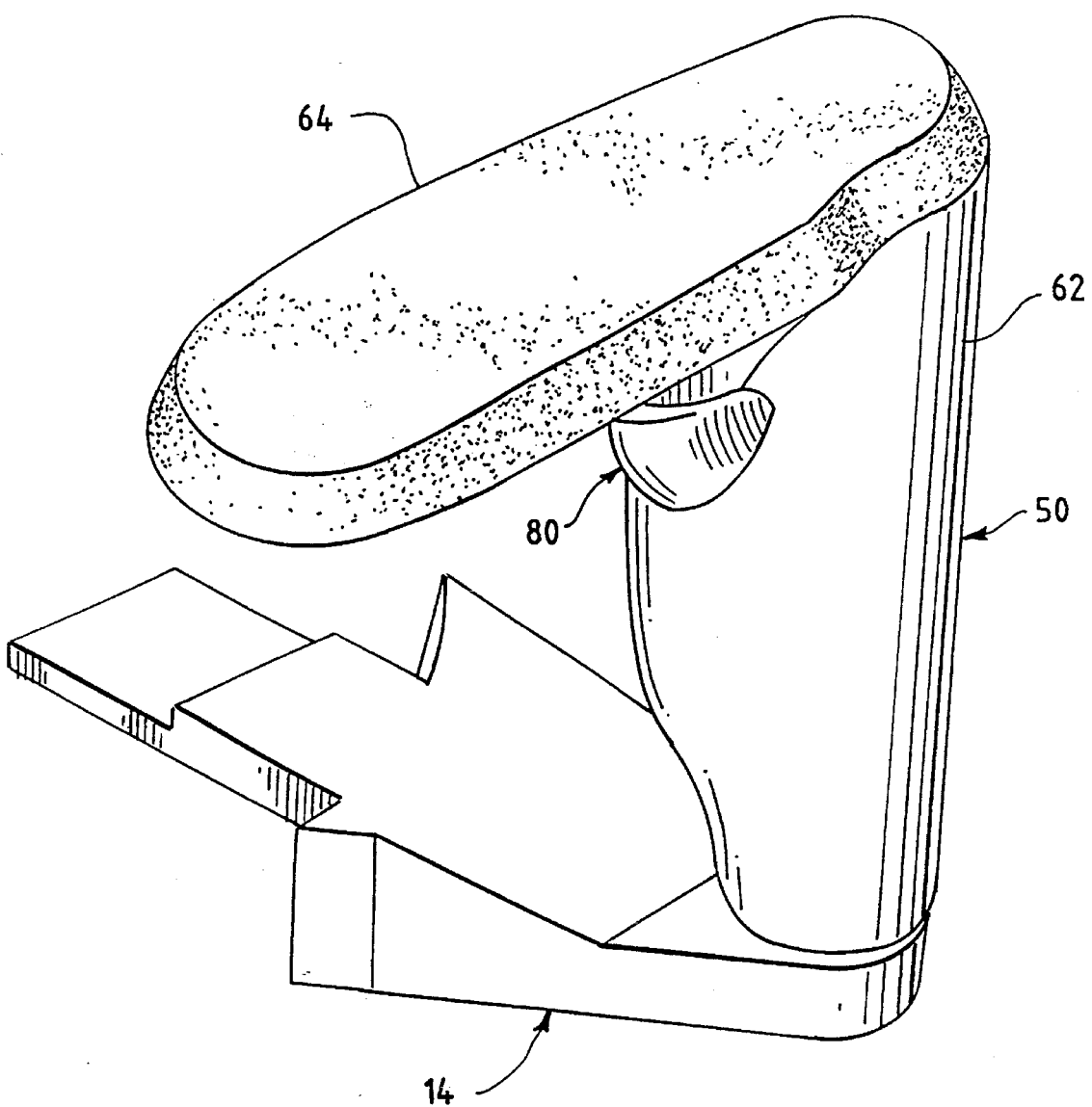
FIG. 2 is a perspective view of a preferred embodiment of the adjustable arm rest member of the present invention.

Referring to the drawings, FIG. 1 shows an adjustable arm rest assembly 10 for use on a chair 11 in accordance with a preferred embodiment of the present invention. The assembly 10 includes a support member 12 or tube that is fixed to a chair 11 beneath the seat thereof. A mounting element 14 extends outward from beneath the seat of the chair 11 with the support member 12 extending vertically upward therefrom. The support member 12 has an internal passageway 16 so that the central portion of the rod 18 can pass therethrough. An aperture 20 in the mounting element 14 receives the button head 21 of the rod 18.

Figure 7:
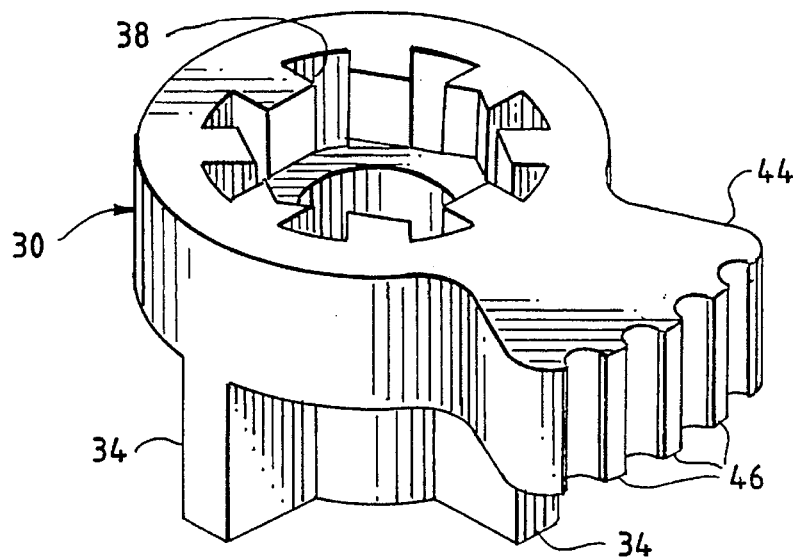
FIG. 7 is a perspective view of the pawl of the preferred embodiment of the present invention.

A locking element or pawl 30 is secured within the top portion 32 of the support member 12. The pawl 30 has four flanges 34 (two shown) that extend at 90 degree angles and mate with corresponding apertures 36 within the top portion 32 of the support member 12. The pawl 30 has a centrally positioned aperture 38 extending therethrough. A fastening mechanism 40 such as a hex nut is mounted therein so as to engage the upper threaded portion 42 of the rod 18. As a result, the pawl 30 is secured in a fixed location to the support member 12 and the chair 11. As best seen in FIG. 7, the pawl 30 has an outwardly projecting portion 44. This projecting portion 44 has a plurality of substantially vertically extending teeth 46 on the end thereof. According to the preferred embodiment, the pawl 30 includes three teeth 46.

In a preferred embodiment, the mounting element 14 has a steel core with a plastic covering. The support member 12 may be manufactured from steel using a cold roll process and the pawl 30 from a plastic material such as acetal.

Figure 3:
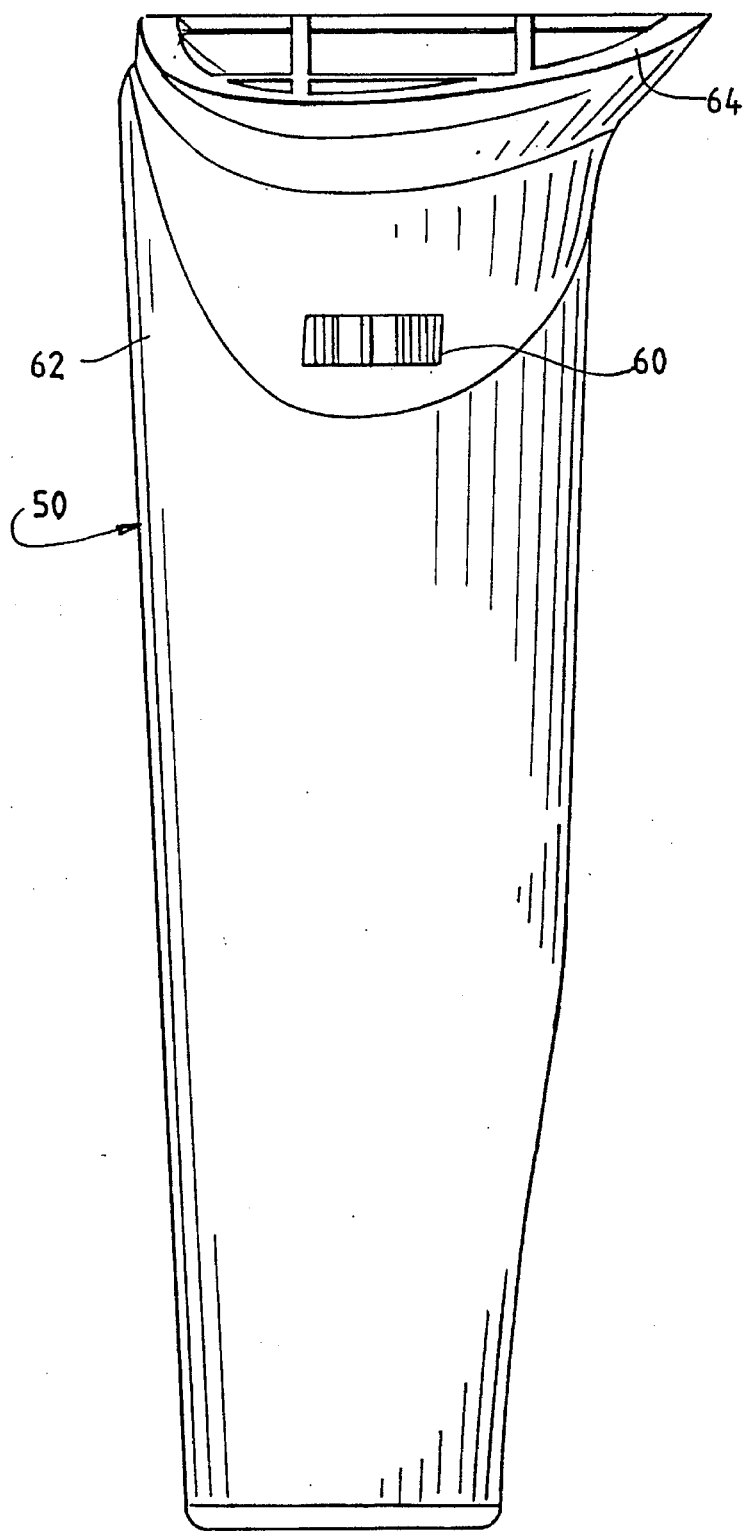
FIG. 3 is a front view of a preferred embodiment of the adjustable arm rest member of the present invention without the actuation element.

The arm rest member 50 is slidably mounted on the support member 12. The arm rest member 50 has an internal passageway 52 or cavity that is sized to receive the support member 12. The arm rest member 50 and the support member 12 extend substantially coaxially with the arm rest member 50 adjustable in a telescoping manner relative to the support member 12. The arm rest member 50 has a centrally located and internal boss that receives a downwardly extending hub 56 from the bottom 57 of the adjustment member 58. As shown in FIG. 3, a slot 60 extends horizontally in the upper portion 62 of the arm rest member 50. A top surface 64 of the arm rest member 50 receives an arm pad 64 that supports the arm of a user. A fastening mechanism such as screws 66 serve to secure the arm pad 64 to the arm rest member 50.

Figure 8:
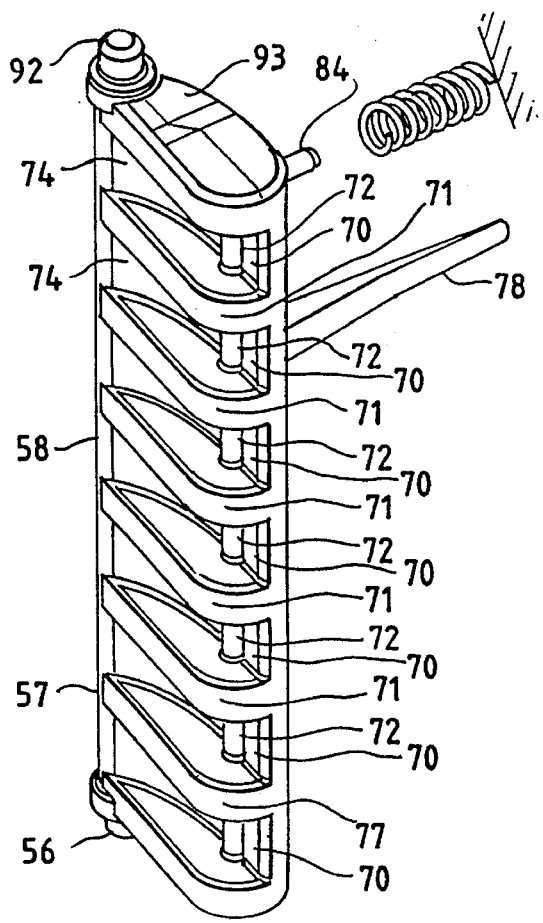
FIG. 8 is a perspective view of the adjustment member of the preferred embodiment of the present invention.

As shown in FIGS. 1 and 8, the adjustment member 58 has a plurality of vertically aligned recesses 70 formed by a plurality of horizontally extending flanges 71. Each recess 70 is sized so as to receive the outwardly projecting portion 44 of the pawl 30. In the preferred embodiment, the adjustment member 58 contains seven recesses 70. Within each recess 70, a pin-shaped surface 72 is centrally located along the curved back wall 74 thereof. The pin-shaped surface 72 is sized to mate with one of the teeth 46 on the pawl 30. In a preferred embodiment, the adjustment member 50 has a height of approximately 5 inches with each recess 70 having a height of approximately ⅜ inch. The adjustment member 50 preferably has a length of approximately 1⅛% inch and a depth of approximately ⅝ inch. A square steel shaft 78 is mounted to the adjustment member 58 on the opposite side of the recesses 70 for use with the actuation member 80. The shaft 78 passes through the slot 60 in the upper portion 62 of the arm rest member 50. Slightly above the shaft 78, a spring engagement surface 84 projects outward a short distance from the adjustment member. The spring 86 is connected to the engagement surface 84 on the adjustment member 58 and extends to the clip 88 on the top surface 64 of the arm rest member 50. The spring 86 acts to bias the adjustment member 58 into engagement with the pawl 30. Preferably, the adjustment member 58 and the arm rest member 50 are manufactured using an injection molding process using glass-filled nylon as produced by Allied Signal under Part No. 8233G. Also, in a preferred embodiment, the actuation element 80 is formed from polypropylene.

An upper hub 92, corresponding to the lower hub 56, extends upward from the top surface 93 of the adjustment member 58. The upper hub 92 is movably connected to the clip 94 that is mounted to the top surface 64 of the arm rest member 50. The upper and lower hubs 92 and 56 define a pivot axis about which the adjustment member 58 pivots when the actuation member 80 is moved by a user. More specifically, the adjustment member 58 is pivotable about the axis defined by the upper and lower hubs 92 and 56. In a preferred embodiment, the clip 94 is manufactured from steel.

The clip 94 has three apertures 96 located along the outer periphery thereof. The apertures 96 receive fastening elements such as the screw 98 that pass therethrough. In this manner, the clip 94 is secured to the top surface 64 of the arm rest member 50. The larger aperture 100 receives the upper hub 92 of the adjustment member 58. Accordingly, the clip 94 and the boss 53 serve to secure the adjustment member 54 to the arm rest member 50.

The actuation member 80 is movably connected to the outer surface of the arm rest member 50. The shaft 78 is mounted to a rear portion of the actuation member 80 in a channel 102 so as to interconnect the actuation member 50 and the adjustment member 58. The shaft 78 passes through and is movable along the length of the slot 60. As a result, the actuation member 80 is also movable in a horizontal plane along the length of the slot 60.

It should be recognized that the preferred embodiment of the present invention shown in the Figures could be modified by those of ordinary skill in the art so as to still practice the present invention. For example, the preferred embodiment could be modified so as to change the relative interconnection of the locking element and the adjustment member with respect to the support member and the arm rest member. More specifically, the locking element could be movably attached to the arm rest member and the adjustment member fixedly attached to the support member. The locking element could then be moved into and out engagement with the adjustment member in order to provide the same relative modes of operation as will be described-below. According to another modification, the adjustment member could slidably engage the locking element rather than pivotably. According to yet a further modification, the mating teeth of the pawl and the pin-shaped surface of the recess could be replaced with a detent and plurality of recesses. Accordingly, it should be recognized that the preferred embodiment of the Applicants' invention shown in the Figures could be modified in a wide variety of ways.

Figure 4:
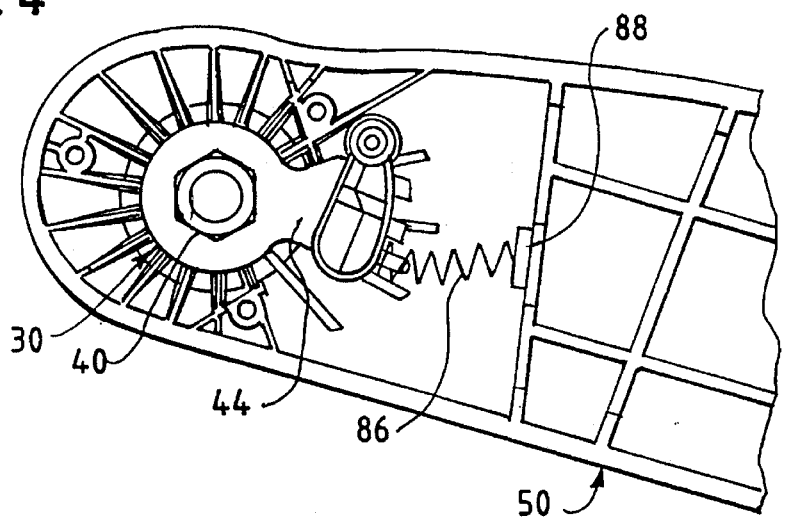
FIG. 4 is a top view of the preferred embodiment of the present invention with the arm rest member in a locked position.
Figure 5:
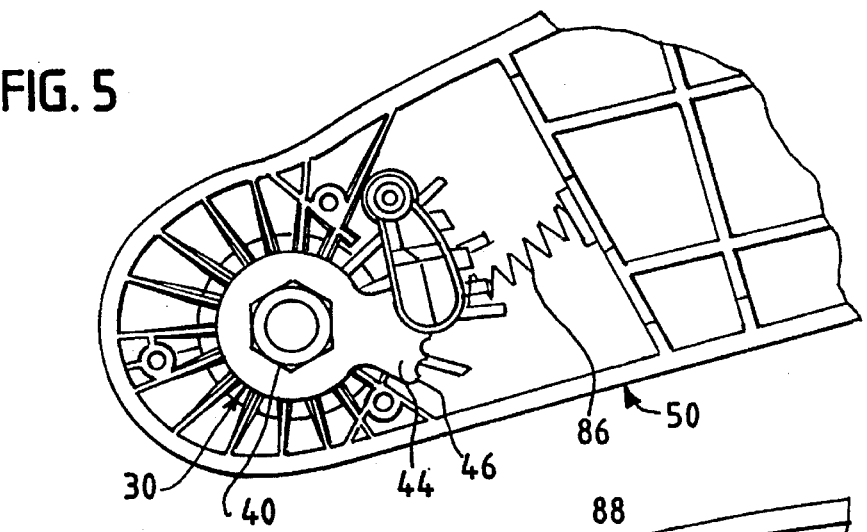
FIG. 5 is a top view of the preferred embodiment of the present invention with the arm rest member in a partially unlocked position or an angularly adjustable position.
Figure 6:
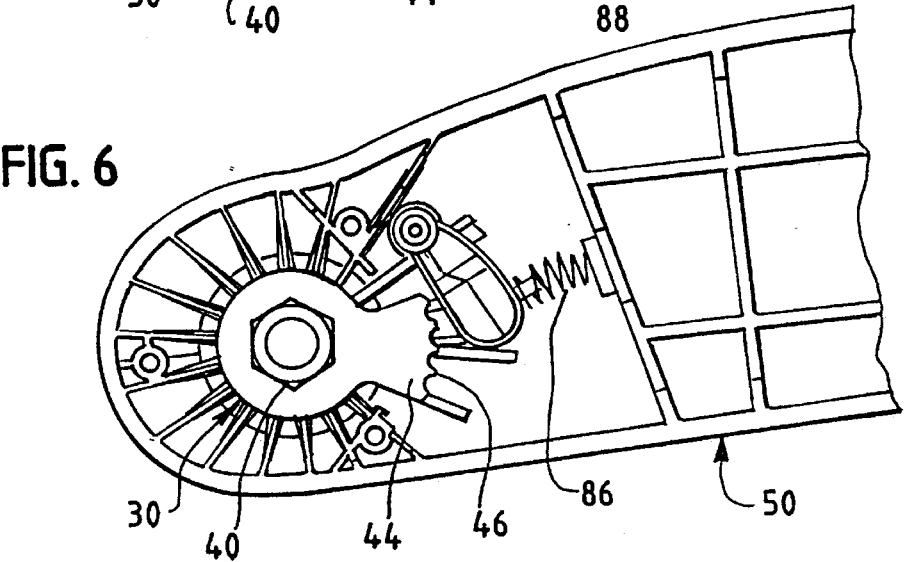
FIG. 6 is a top view of the preferred embodiment of the present invention with the arm rest member shown in the unlocked position so as to be angularly and vertically adjustable.

FIGS. 4–6 best illustrate the actual operation of the arm rest assembly 10. In the locked position, as shown in FIG. 4, the spring 86 biases the adjustment member 58 into engagement with the pawl 30 so as to secure the arm rest member 50 in a fixed position. More particularly, the projecting portion 44 of the pawl 30 is captured within a recess 70 and one of the teeth 46 on the end of the pawl 30 is engaged by the pin-shaped surface 72 on the back wall 74 of the recess 70. In this position, the arm rest member 50 is locked into position with the support member 12.

In order to adjust the angular position of the arm rest member 50 (but not the vertical position), a user would slide the actuation member 80 approximately 10° along the outer surface of the upper portion 62 of the arm rest member 50. The user thereby overcomes the force of the spring 86 that biases the adjustment member 56 and the actuation element 80 into the locked position. As a result of this movement, the adjustment member 58 pivots out a short distance from engagement with the pawl 30. More specifically, the teeth 46 of the pawl 30 are disengaged from the pin-shaped surface 72 on the back wall 74 of the recess 70. However, the adjustment member 58 has not pivoted so far as to completely disengage the projecting portion 44 from the recess 70. Rather, the projecting portion 44 still remains captured within the selected recess 70. In this position, as shown in FIG. 5, the arm rest member 50 may be rotated in order to adjust the angular position of the arm rest member 50 relative to the support member 12. The arm rest member 50 is not vertically adjustable in this position.

After rotating the arm rest member 50 to the new angular position, a user releases the actuation element 80 in order to lock the arm rest member 50 into the new angular position. The adjustment member 58 pivots back into complete engagement as before. Except, in this new angular position, a different tooth 46 on the end of the pawl 30 will now be engaged by the pin-shaped surface 72 of the recess 70. In this manner, the arm rest member 50 is now fixed in a new angular position.

In order to adjust the height or vertical position of arm rest member 50 relative to the support member 12, the user again slides the actuation member 80. This time, however, the user must slide the actuation element 80 at least 20° or until the shaft 78 reaches the opposite end of the slot 60 so as to prevent further movement. By moving the actuation member 80 in this manner, the adjustment member 58 is pivoted completely out from engagement with the pawl 30. In other words, the entire projecting portion 44 including the teeth 46 are completely disengaged from the recess 70. In this position, as shown in FIG. 6, the arm rest member 50 is movable both vertically and angularly. The arm rest member 50 may then be moved upward, downward or angularly as selected by the user.

Once the user has selected a new vertical position and angular position (if desired), the actuation element 80 is released so as return to the locked position. The adjustment member 58 pivots back into engagement with the pawl 30. The projecting portion 44 of the pawl 30 is now captured within a new recess 70 on the adjustment member 58 with a tooth 46 on the end of the pawl 30 engaging the pin-shaped surface 72 in the recess 70. In the preferred embodiment, the adjustable arm rest assembly 10 has a 4-inch range of adjustment.

The embodiment described is illustrative and not restrictive. The scope of the invention is indicated by the claims rather than by the foregoing description. For example, as described above, the relative positioning of the adjustment member and the pawl with respect to the support member and the arm rest member could be interchanged without departing from the spirit of this invention. In addition, the number of teeth in the pawl or the specific materials used to manufacture the elements of the present invention could also be changed. The invention therefore may be embodied in other specific forms without departing from the spirit of the invention. Accordingly, all changes which come within the scope of the claims are intended to be embraced therein.

We claim:

1. An adjustable arm rest assembly for use on a chair, said arm rest assembly comprising:

a support member for attachment to a chair and extending substantially upward therefrom;

an arm rest member extending substantially coaxially with said support member;

a locking element attached to said support member and said arm rest member, said locking element having a projecting portion including an end portion, said end portion including a first mating element;

an adjustment member attached to the other of said support member and said arm rest member, said adjustment member being substantially horizontally pivotable with respect to said locking element, said adjustment member having a plurality of vertically spaced and horizontally extending flanges, said flanges spaced apart so as to form a plurality of recesses, each recess sized to receive said projecting portion of said locking element, each recess having a second mating element corresponding to said first mating element;

whereby said arm rest member is movable in a horizontal plane when said first and said second mating elements are disengaged and said arm rest member is also movable in both a horizontal plane and a vertical plane when said first and second mating elements are disengaged and said projecting portion of said locking element is disengaged from said recess of said adjustment member.

2. The adjustable arm rest assembly of claim 1 wherein said first mating element is a plurality of substantially vertically extending and horizontally aligned teeth.

3. The adjustable arm rest assembly of claim 2 wherein said second mating element is a projecting vertically extending pin-shaped surface sized to mate with one of said teeth of said first mating element.

4. The adjustable arm rest assembly of claim 3 wherein said locking element is a pawl.

5. The adjustable arm rest assembly of claim 4 wherein said arm rest member includes a cavity that receives said support member.

6. The adjustable arm rest assembly of claim 5 further comprising an actuation member attached to an outer surface of said arm rest member.

7. The adjustable arm rest assembly of claim 6 wherein said actuation member is attached to said adjustment member.

8. The adjustable arm rest assembly of claim 7 further comprising a spring connected to a top of said adjustment member and said arm rest member in order to bias said adjustment member into engagement with said pawl.

9. An adjustable arm rest assembly for use on a chair, said arm rest assembly comprising:

a support member for attachment to a chair and extending substantially upward therefrom;

an arm rest member extending substantially coaxially with said support member;

a locking element attached to said support member, said locking element having a projecting portion including an end portion, said end portion including a first mating element;

an adjustment member attached to said arm rest member, said adjustment member being substantially horizontally pivotable with respect to said locking element, said adjustment member having a plurality of vertically spaced and horizontally extending flanges, said flanges spaced apart so as to form a plurality of recesses, each recess sized to receive said projecting portion of said locking element, each recess having a second mating element corresponding to said first mating element;

whereby said arm rest member is movable in a horizontal plane when said first and said second mating elements are disengaged and said arm rest member also movable in both a horizontal plane and a vertical plane when said first and second mating elements are disengaged and said projecting portion of said locking element is disengaged from said recess of said adjustment member.

10. The adjustable arm rest assembly of claim 9 wherein said first mating element is a plurality of substantially vertically extending and horizontally aligned teeth.

11. The adjustable arm rest assembly of claim 10 wherein said second mating element is a projecting substantially vertically extending pin-shaped surface sized to mate with one of said teeth of said first mating element.

12. The adjustable arm rest assembly of claim 11 wherein said arm rest member includes a cavity defined by an inner surface that receives said support member.

13. The adjustable arm rest assembly of claim 12 further comprising an actuation element attached to an outer surface of said arm rest member and connected to said adjustment member.

14. The adjustable arm rest assembly of claim 13 further comprising a bracket that is attached to said adjustment member in order to secure said adjustment member to the arm rest member.

15. The adjustable arm rest assembly of claim 14 further comprising a spring attached to a top of said adjustment member and said arm rest member in order to bias said adjustment member into engagement with said locking element.

16. An adjustable arm rest assembly for use on a chair, said arm rest assembly comprising:

a support member for attachment to a chair and extending substantially upward therefrom;

an arm rest member extending substantially coaxially with said support member, said arm rest member defining a cavity that slidably receives said support member;

a locking element attached to said support member, said locking element having a projecting portion including an end portion, said end portion including a first mating element;

an adjustment member attached to said arm rest member, said adjustment member being horizontally pivotable with respect to said locking element, said adjustment member having a plurality of vertically spaced flanges, said flanges spaced apart so as to form a plurality of recesses, each recess sized to receive said projecting portion of said locking element, each recess having a second mating element corresponding to said first mating element;

whereby said arm rest member is movable in a horizontal plane when said first and said second mating elements are disengaged and said arm rest member is also movable in both a horizontal plane and a vertical plane when said first and second mating elements are disengaged and said projecting portion of said locking element is disengaged from said recess of said adjustment member.

17. The adjustable arm rest assembly of claim 16 further comprising a spring connected to a top of said adjustment member and said arm rest member in order to bias said adjustment member into engagement with said first locking element.

18. The adjustable arm rest assembly of claim 17 further comprising an actuation member attached to said adjustment member and an outer surface of said arm rest member.

19. The adjustable arm rest assembly of claim 18 wherein said first mating element is a plurality of substantially vertically extending and horizontally aligned teeth and said second mating element is a projecting substantially vertically extending pin-shaped surface sized to mate with one of said teeth of said first mating element.

\* \* \* \* \*